United States Patent [19]

Ito et al.

[11] Patent Number: 4,953,152
[45] Date of Patent: Aug. 28, 1990

[54] MASTERING MACHINE FOR MAKING AN ON-LAND RECORDING MASTER DISK WITH TWO BEAM ALIGNMENT SERVO LOOPS

[75] Inventors: Masaru Ito, Sagamihara; Hitoshi Watanabe; Toshiaki Taii, both of Yuuki; Yoshito Tsunoda, Suginami, all of Japan

[73] Assignees: Hitachi, Ltd., Tokyo; Hitachi Maxell, Ltd., Osaka, both of Japan

[21] Appl. No.: 138,582

[22] Filed: Dec. 29, 1987

[30] Foreign Application Priority Data

Jan. 9, 1987 [JP] Japan .................. 62-1616

[51] Int. Cl.⁵ .......................... G11B 7/09H
[52] U.S. Cl. .................... 369/44.39; 369/31
[58] Field of Search .................. 369/44–46, 369/48–51

[56] References Cited

U.S. PATENT DOCUMENTS

| | | | |
|---|---|---|---|
| 4,525,823 | 6/1985 | Sugiyama et al. | 369/46 X |
| 4,571,712 | 2/1986 | Romano et al. | 369/46 X |
| 4,669,072 | 5/1987 | Miura et al. | 369/44 |
| 4,670,869 | 6/1987 | Chen | 369/44 X |
| 4,700,336 | 10/1987 | Yoshida et al. | 369/44 |
| 4,707,816 | 11/1987 | Yonezawa et al. | 369/44 |
| 4,782,474 | 11/1988 | Aidi et al. | 369/44 |

FOREIGN PATENT DOCUMENTS

| | | | |
|---|---|---|---|
| 59-77642 | 5/1984 | Japan | 369/46 |
| 60-50733 | 3/1985 | Japan . | |
| 60-157730 | 8/1985 | Japan | 369/44 |
| 60-209933 | 10/1985 | Japan | 369/44 |
| 61-13458 | 1/1986 | Japan . | |
| 61-24029 | 2/1986 | Japan | 369/44 |

Primary Examiner—Aristotelis M. Psitos
Attorney, Agent, or Firm—Antonelli, Terry, Stout & Kraus

[57] ABSTRACT

A mastering machine for an optical disk provided with a closed loop for controlling the incident angle of at least one of the guide groove forming beam and header forming beam which enter a condenser lens, and thereby controlling to a predetermined level the distance between a guide groove forming light spot and a header forming light spot on a photosensitive layer.

31 Claims, 2 Drawing Sheets

MASTERING MACHINE FOR MAKING AN ON-LAND RECORDING MASTER DISK WITH TWO BEAM ALIGNMENT SERVO LOOPS

BACKGROUND OF THE INVENTION

This invention relates to a mastering machine for an optical disk, and more particularly to a mastering machine suitably used to make a master disk for on-land recording having concentric or spiral guide grooves and recording data between these grooves.

For an on-land recording master disc, it is necessary to record not only data but also header signals, such as track addresses and sector addresses between the guide grooves.

The mastering machine used for this purpose are proposed in Japanese Patent Laid-open No. 50733/1985 and Japanese Patent Laid-open No. 13458/1986 (U.S. application Ser. No. 685,123 and its continuing application). In these apparatuses, the light emitted from a laser light source is divided into a guide groove recording beam and a header recording beam by a beam splitter, and these beams are modulated in intensity according to the signals by light modulators. The modulated beams are then synthesized by another beam splitter and irradiate a photosensitive layer, which is formed on a disk, through a recording lens, and thus signals are recorded on the photosensitive layer. In order to record a header signal between the guide grooves, the guide groove recording beam is set so that it enters a lens at a corresponding incident angle, which is set by mirrors, with respect to the header recording beam.

In these conventional apparatuses, the incident angles of the guide groove recording beam and header recording beam are determined in accordance with the accuracy of the mechanical position of each of the elements constituting an optical system. Consequently, when the position of each of these elements varies due to the variations of the temperature and mechanical vibrations, the distance between the patterns, which are recorded on the photosensitive layer, of the header and guide grooves varies.

If the recording and reproduction of data are done on an optical disk made from the master disk, which is obtained by developing the photosensitive layer, variations in the level of read signals and crosstalks from an adjacent track signals would occur, and this causes the misreading of the data.

SUMMARY OF THE INVENTION

An object of the present invention is to provide a mastering machine for optical disk which does not cause the deviation of the positions of optical spots for forming guide grooves and headers on the photosensitive layer on a disk even when the displacement of the optical elements of the apparatus occurs due to the variations in the above-mentioned environmental conditions.

This object can be achieved by subjecting the positions of the optical spots to closed-loop control.

According to the present invention, the angles of a guide groove-forming beam and a header-forming beam entering a recording lens are detected, and the incident angles of these two beams or the incident angle of one of them is controlled to a predetermined level. This enables the distance between the guide groove-forming optical spot and header-forming optical spot to be controlled to a predetermined interval on the photosensitive layer.

EMBODIMENT

Figure 1:
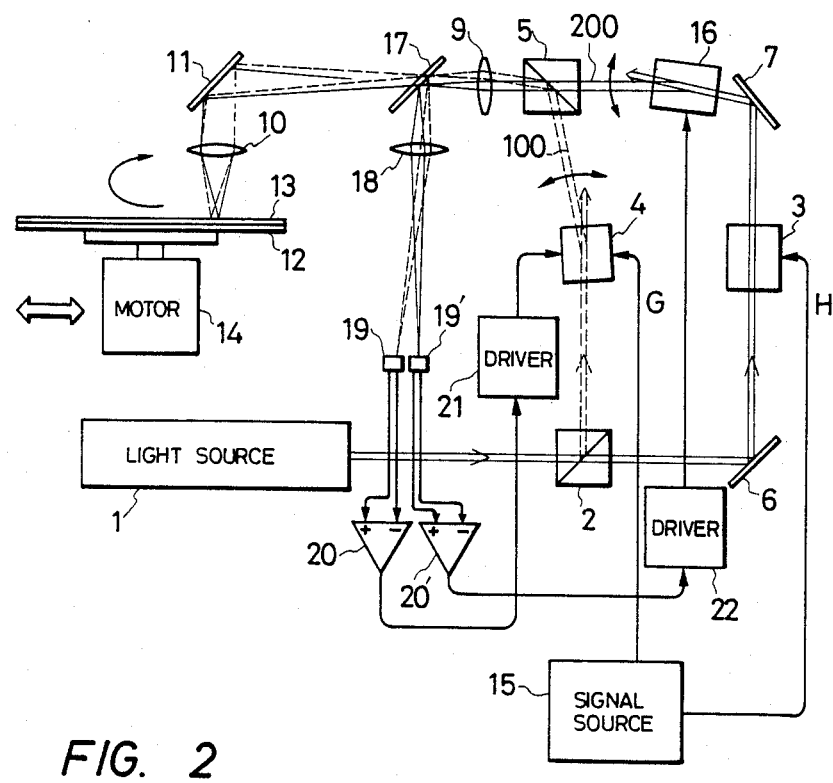
FIG. 1 is a schematic diagram of an embodiment of the present invention.

An embodiment of the present invention is shown in FIG. 1. The light emitted from a laser light source 1 is divided into a guide groove recording beam 100 and a header recording beam 200 by a beam splitter 2, and subjected to intensity modulation by a light modulating deflector 4 and a light modulator 3, which are driven by signals G. H, respectively, from a signal source, in accordance with the signals. The header recording beam 200 is further subjected to the deflection of optical path by a light deflector 16. The guide groove recording beam 100 is subjected to the deflection of optical path by the light modulating deflector 4. The light deflector 16 and light modulating deflector 4 consist suitably of acousto-optical elements (AO). The light deflectors may, of course, consist of galvanomirrors or piezomirrors.

The two recording beams 100, 200 which have been subjected to modulation and deflection respectively are synthesized by a beam splitter 5 and focused as two optical spots on a photosensitive layer 13, which is formed on a disk 12, through a lens 9, a mirror 11 and a recording lens 10. A description of a focus control system used to control the position of the recording lens 10 so that the optical spots are formed correctly on the photosensitive layer 13 is omitted. The rotation of the disk 12 is controlled by a motor 14, and the radial movement thereof by a feed driving unit (not shown).

A beam sampler or splitter 17 is disposed between the lens 9 and serves to split off the mirror 11, and a part of each of the two recording beams 100, 200, while permitting the remaining part of the beams 100, 200 to pass therethrough and be directed onto the disc 12. The split off part of the two recording beams 100, 200 are focused on photodetectors 19, 19' respectively by a lens 18. The focal length of the lens 18 is far larger than that of the recording lens 10. Accordingly, the distance between the two optical spots formed by the lens 18 is long enough to dispose the two photodetectors 19, 19'.

Figure 2:
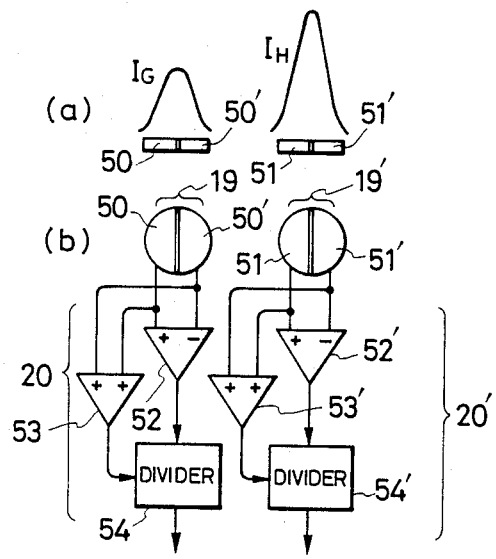
FIGS. 2a and 2b are schematic diagrams of a photo detector and a computing unit used in the present invention.

Each of the photodetectors 19, 19' consists of a two-split photodiode shown in FIG. 2. FIG. 2a shows the intensity distributions $I_G$, $I_H$ of the two optical spots on the photodetectors. As shown in FIG. 2b, the photodetectors 19, 19' have a pair of photodiodes 50, 50' and 51, 51' (light-receiving elements) respectively. The difference and sum of the output from the photodiodes 50, 50' and those from the photodiodes 51, 51' are amplified by amplifiers 52, 53 and 52', 53', respectively, and outputs from these amplifiers are divided by dividers 54, 54', from these signals representative of the positions of the optical spots on the photodetectors are then obtained. When an optical spot is distributed evenly on two photodiodes as shown in FIG. 2a, the output level from the dividers is zero, and, when it is distributed unevenly, the output level of dividers is generated in accordance with the degree of the unbalance therein. The two-split diodes may be substituted by position detecting diodes (PSD).

Thus, outputs corresponding to the deviation of the positions of the optical spots of the guide groove recording beam and header recording beam from the centers of the detectors 19, 19' are obtained from computing units 20, 20' respectively. These outputs are converted in driving circuits 21, 22 to then drive the light modulating deflector 4 and light deflector 16 and deflect the respective recording beams. The system described heretofore constitutes a closed-loop control system, and the light spots of the recording beams taken out by the sampler are each controlled so that these light spots are distributed symmetrically with respect to the centers of the photodetectors 19, 19'. If the angles at which the guide groove recording beam and header recording beam enter the lens 10 are each controlled, the positions of the light spots on the photosensitive layer 13 can be controlled properly.

Figure 3:
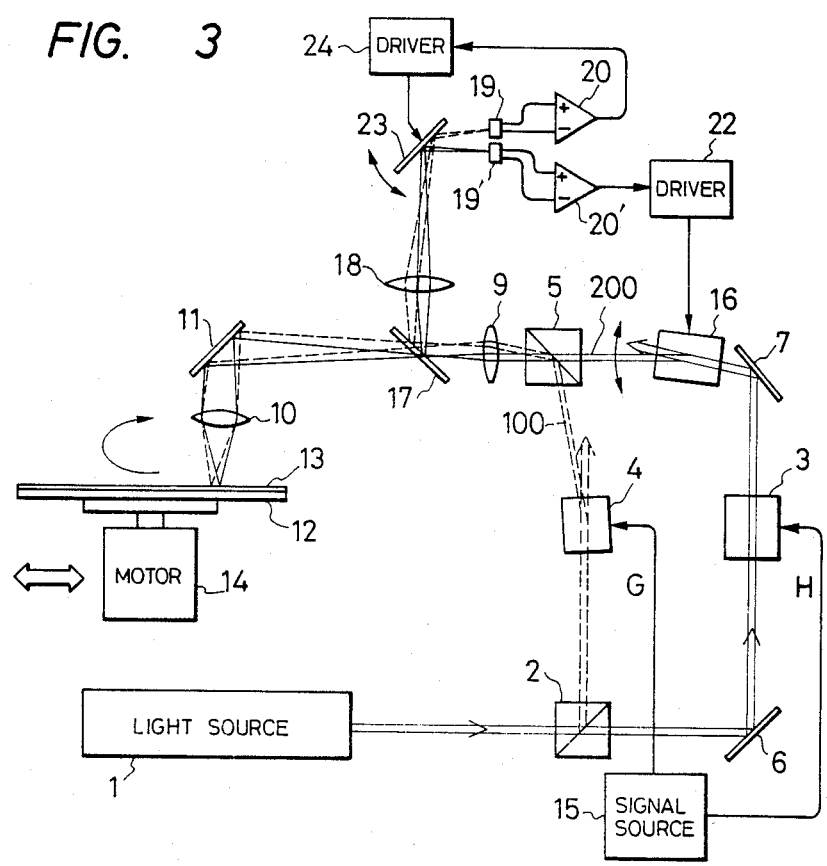
FIGS. 3-5 illustrate other embodiments of the present invention.

Another embodiment of the present invention is shown in FIG. 3. In this embodiment, the deflection of a header recording beam 200 is controlled by a light deflector 16, and that of a guide groove recording beam and a header recording beam taken out by a beam sampler or splitter 17 are controlled by a galvanomirror 23. The distance between the two light spots on a photosensitive layer 13 is thus controlled. Namely, a part of each of the guide groove recording beam and header recording beam taken out by the beam sampler 17 is focused on photodetectors 19, 19' by a lens 18 through a galvanomirror 23. The positions of the photodetectors 19, 19' are fixed with the distance corresponding to the distance between the two light spots on the photosensitive layer. The positioning of the guide groove recording beam 100 shown by dotted line in the drawing taken out by the beam sampler or splitter 17 is controlled by a galvanomirror 23, which is actuated by a computing unit 20 and a drive circuit 24, in such a manner that the light spot is distributed symmetrically with respect to the center of the photodetector 19. The header recording beam is also deflected at the same time by the deflecting operation of this galvanomirror 23. The positions of the two light spots on the photosensitive layer 13 are not varied by the operation of the galvano-mirror 23. Therefore, a light deflector 16 is driven through a computing unit 20' and a drive circuit 22 so that the header recording beam taken out by the beam sampler or splitter 17 is distributed symmetrically with respect to the center of the photodetector 19'. Thus, the header recording beam 200 is deflected and distributed symmetrically with respect to the center of the photodetector 19'. The distance between the two light spots on the photosensitive layer 13 can be controlled by thus deflecting one of the two recording beams.

Figure 4:
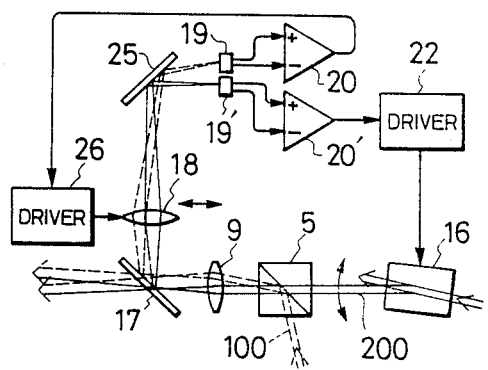

Still another embodiment of the present invention is shown in FIG. 4. In this embodiment, a guide groove recording beam separated by a beam sampler or splitter 17 is distributed symmetrically with respect to the center of a photodetector 19, by moving a lens 18, instead of the galvanomirror 23 shown in FIG. 3, perpendicularly to the optical axis and in parallel with a plane including the two beams passing through this lens 18. The movement of the lens 18 is controlled by driving an actuator (not shown), which is attached to the lens 18, by a drive circuit 26. A header recording beam 200 is also distributed in the same manner as in embodiment of FIG. 3 so as to become symmetrical with respect to the center of a photodetector 19', by driving a light deflector 16 on the basis of a beam position error signal detected by the photodetector 19'.

Figure 5:
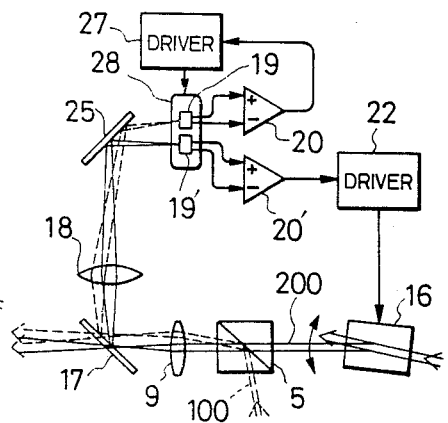

FIG. 5 shows a further embodiment of the present invention. In this embodiment, the movement of the galvanomirror in the embodiment of FIG. 3 and the movement of the lens in the embodiment of FIG. 4 are substituted by the movement of a carriage 28 in the direction perpendicular to the optical axes of a guide groove recording beam and a header recording beam taken out by a beam sampler or splitter 17, and, in accordance with the movement of this carriage 28, two photodetectors 19, 19' as a whole on the carriage are moved with the relative positions of these photodetectors kept fixed. In this embodiment, the carriage 28 is controlled by a computing unit 20 and a drive circuit 27 so that the guide groove recording beam is distributed symmetrically with respect to the center of the photodetector 19. The header recording beam 200 is distributed symmetrically with respect to the center of photodetector 19' by controlling a light deflector 16 by a computing unit 20' and a drive circuit 22. Thus, two light spots of the guide groove recording beam and header recording beam can be positioned with a predetermined distance on a photosensitive layer 13 on a disk 12.

According to the present invention described above, a header signal can be recorded with a high accuracy in the central portions among the guide grooves, and, therefore, a highly reliable master disk, in which crosstalk rarely occurs, and in which the level of a regenerative signal is stable, can be effectively manufactured.

What is claimed is:

1. A mastering machine for an optical disk comprising:

light source means for providing a light beam;
beam dividing means for dividing the light from the light source means into first and second beams;
first and second light modulating means respectively disposed in optical paths in the first and second beams for modulating intensities of the first and second beams;
beam splitting means for splitting off a portion of each of the first and second beams and for enabling a remaining portion of each of the first and second beams to pass therethrough;
recording lens means for focusing the passed through portions of the first and second beams onto a master disk so that light spots of the first and second beams on the master disk are spaced from each other in a radial direction of the master disk;
first and second light detecting means for respectively receiving the split off portions of the first and second beams and for detecting positions of images of the split off portions of the first and second beams and providing outputs indicative thereof;
first steering means for controlling a relative position of the image of the split off portion of the first beam and the first light detecting means;
second steering means for controlling a relative position of the image of the split off portion of the second beam and the second light detecting means;
means forming a first closed loop including the first light detecting means and the first steering means for controlling the first steering means in accordance with the output from the first light detecting means so that the position of the image of the split off portion of the first beam agrees with a predetermined portion of the first light detecting means; and means forming a second closed loop including the second steering means and the second light detecting means for controlling the second steering means in accordance with the output of the second light detecting means so that the position of the image of the split off portion of the second beam agrees with a predetermined portion of the second light detecting means;

whereby the light spots of the first and second beams are maintained at a predetermined spacing from each other.

2. A mastering machine according to claim 1, wherein the first steering means includes a light deflector disposed in the optical path of the first beam.

3. A mastering machine according to claim 1, wherein the second steering means includes a light deflector disposed in the optical path of the second beam.

4. A mastering machine according to claim 3, wherein the light deflector also serves as the second modulating means.

5. A mastering machine according to claim 1, wherein the second steering means includes a light deflector disposed in optical paths of the split off portions of the first and second beams.

6. A mastering machine according to claim 1, wherein the second steering means includes a lens disposed in optical paths of the split off portions of the first and second beams for enabling focusing of the split off portions of the first and second beams, respectively, on the first and second light detecting means.

7. A mastering machine according to claim 1, wherein the second steering means includes moving means for moving the first and second light detecting means.

8. A mastering machine according to claim 1, wherein each of the first and second light detecting means includes a two-split photodiode, each of the first and second light detecting means enabling generation of, in accordance with a difference output from the respective two-split photodiode, a position signal representative of the position at which each of the images of the split off portions of the first and second beams projects on the respective two-split photodiode.

9. A mastering machine according to claim 8, wherein each of the first and second light detecting means includes difference means for subtracting outputs of the respective two-split photodiode, summing means for summing the outputs of the respective two-split photodiodes, and dividing means for dividing an output of the difference means by an output of the summing means.

10. A mastering machine for an optical disk comprising:

a light source for providing a light beam;

beam dividing means for dividing the light beam from the light source into first and second beams;

first and second light modulating means respectively disposed in optical paths of the first and second beams for modulating intensities of the first and second beams;

beam combining means for combining first and second modulated beams from the first and second light modulating means;

beam splitting means for splitting off a portion of each of the first and second modulated beams and for enabling a remaining portion of each of the first and second modulated beams to pass therethrough;

recording lens means for focusing the passed through portions of the first and second modulated beams onto a master disk so that light spots of the first and second modulated beams on the master disk are spaced from each other in a radial direction of the master disk;

light detecting means having a first two-split detector for receiving the split off portion of the first modulated beam and for generating, in accordance with a difference output from the first two-split detector, a first position signal representative of a position at which an image of the split off portion of the first modulated beam projects on the first two-split detector;

second light detecting means including a second two-split detector for receiving the split off portion of the second modulated beams and for generating, in accordance with a difference output from the second two-split detector, a second position signal representative of a position at which an image of the split off portion of the second modulated beam projects on the second two-split detectors;

first beam deflecting means disposed in the optical path of the first beam;

second beam deflecting means disposed in the optical path of the second beam;

first driver means for controlling the first beam deflecting means in accordance with the first position signal so that the position of the image of the split off portion of the first modulated beam agrees with a predetermined portion of the first two-split detector; and second driver means for controlling the second beam deflecting means in accordance with the second position signal so that the position of the image of the split off portion of the second modulated beam agrees with a predetermined portion of the second two-split detector;

whereby the light spots of the first and second modulated beams are maintained at a predetermined spacing from each other.

11. A mastering machine according to claim 10, wherein the second beam deflecting means also serves as the second light modulating means.

12. A mastering machine according to claim 10, wherein the first light detecting means includes difference means for subtracting outputs of the first two-split detector, summing means for summing the outputs of the first two-split detector, and dividing means for dividing an output of the difference means by an output of the summing means.

13. A mastering machine according to claim 10, wherein the second light detecting means includes difference means for subtracting outputs of the second two-split detector, summing means for summing the outputs of the second two-split detector. and dividing means for dividing an output of the difference means by an output of the summing means.

14. A mastering machine for an optical disk comprising:

light source means for providing a light beam;

beam dividing means for dividing the light beam from the light source means into first and second beams;

first and second light modulating means respectively disposed in optical paths of the first and second beams for modulating intensities of the first and second beams;

beam combining means for combining the first and second modulated beams from the first and second light modulating means;

beam splitting means for splitting off a portion of each of the first and second modulated beams and enabling a remaining portion of each of the first and second modulated beams to pass therethrough;

recording lens means for focusing the passed through portions of the first and second modulated beams onto a master disk so that light spots of the first and second modulated beams on the master disk are spaced from each other in a radial direction of the master disk;

first light detecting means including a first two-split detector for receiving the split off portion of the first modulated beam and for generating, in accordance with a difference output from the first two-split detector, a first position signal representative of a position of which an image of the split off portion of the first modulated beam projects onto the first two-split detector;

second light detecting means including a second two-split detector for receiving the split off portion of the second modulated beam and for generating, in accordance with a difference output from the second two-split detector, a second position signal representative of a position at which an image of the split off portion of the second modulated beam projects onto the second two-split detectors;

first beam deflecting means disposed in the optical path of the first beam;

second beam deflecting means disposed in optical paths of the split off portions of the first and second modulated beams;

first driver means for controlling the first beam deflecting means in accordance with the first position signal so that the position of the image of the split off portion of the first modulate beam agrees with a predetermined portion of the first two-split detector; and second driver means for controlling the second beam deflecting means in accordance with the second position signal so that the position of the image of the split off portion of the second modulated beam agrees with a predetermined portion of the second two-split detector;

whereby the light spots of the first and second modulated beams are maintained at a predetermined spacing from each other.

15. A mastering machine according to claim 14, wherein the first light detecting means includes difference means for subtracting outputs of the first two-split detector, summing means for summing the outputs of the first two-split detector, and dividing means for dividing an output of the difference means by an output of the summing means.

16. A mastering machine according to claim 14, wherein the second light detecting means includes difference means for subtracting outputs of the second two-split detector, summing means for summing the outputs of the second two-split detector, and dividing means for dividing an output of the difference means by an output of the summing means.

17. A mastering machine for an optical disk comprising:

light source means for providing a light beam;

beam dividing means for dividing the light beam from the light source means into first and second beams;

first and second light modulating means respectively disposed in optical paths of the first and second beams for modulating intensities of the first and second beams;

beam combining for combining the first and second modulated beams from the first and second light modulating means;

beam splitting means for splitting off a portion of each of the first and second modulated beams and enabling a remaining portion of each of the first and second modulated beams to pass therethrough;

recording lens means for focusing the passed through portions of the first and second modulated beams onto a master disk so that light spots of the first and second modulated beams on the master disk are spaced from each other in a radial direction of the master disk;

first light detecting means including a first two-split detector for receiving the split off portion of the first modulated beam and for generating, in accordance with a difference output from the first two-split detector, a first position signal representative of a position at which an image of the split off portion of the first modulated beam projects onto the first two-split detector;

second light detecting means including a second two-split detector for receiving the split off portion of the second modulated beam and for generating, in accordance with a difference output from the second two-split detector, a second position signal representative of a position at which an image of the split off portion of the second modulated beam projects on the second two-split detector;

first beam deflecting means disposed in the optical path of the first beam;

lens means disposed in optical paths of the split off portions of the first and second modulated beams for focusing the split off portions of the first and second modulated beams, respectively, on the first and second two-split detectors;

first driver means for controlling the first beam deflecting means in accordance with the first position signal so that the position of the image of the split off portion of the first modulated beam agrees with a predetermined portion of the first two-split detector;

second driver means for moving the lens means in accordance with the second position signal so that the position of the image of the split off portion of the second modulated beam agrees with a predetermined portion of the second two-split detector;

whereby the light spots of the first and second modulated beams are maintained at a predetermined spacing from each other.

18. A mastering machine according to claim 19, wherein the first light detecting means includes difference means for subtracting outputs of the first two-split detector, summing means for summing the outputs of the first two-split detector and dividing means for dividing an output of the difference means by an output of the summing means.

19. A mastering machine according to claim 17, wherein the second light detecting means includes a difference means for subtracting outputs of the second two-split detector, summing means for summing the outputs of the second two-split detector, and dividing means for dividing an output of a difference means by an output of the summing means.

20. A mastering machine for an optical disk comprising:
- light source means for providing a light beam;
- beam dividing means for dividing the light beam from the light source means into first and second beams;
- first and second light modulating means respectively disposed in optical paths of the first and second beams for modulating intensities of the first and second beams;
- the beam combining means for combining first and second modulated beams from the first and second light modulating means;
- beams splitting means for splitting off a portion of each or the first and second modulated beams and for enabling a remaining portion of each of the first and second modulated beams to pass therethrough;
- recording lens means for focusing the passed through portions of the first and second modulated beams onto a master disk so that light spots of the first and second modulated beams on the master disk are spaced from each other in a radial direction of the master disk;
- first light detecting means including a first two-split detector for receiving the split off portion of the first modulated beam and for generating, in accordance with a difference output from the first two-split detector, a first position signal representative of a position at which an image of the split off portion of the first modulated beam projects on the first two-split detector;
- second light detecting means including a second two-split detector for receiving the split off portion of the second modulated beam and for generating, in accordance with a difference output from the second two-split detector, a second position signal representative of a position at which an image of the split off portion of the second modulated beam projects on the second two-split detector;
- first beam deflecting means disposed in the optical path of the first beam;
- moving means for moving the first and second two-split detector;
- first driver means for controlling the first beam deflecting means in accordance with the first position signal so that the position of the image of the split off portion of the first modulated beam agrees with a predetermined portion of the first two-split detectors; and
- second driver means for controlling the moving means in accordance with the second position signal so that the position of the image of the split off portion of the second modulated beam agrees with a predetermined portion of the second two-split detector;
- whereby the light spots of the first and second modulated beams are maintained at a predetermined spacing from each other.

21. A mastering machine according to claim 20, wherein the first light detecting means includes difference means for subtracting outputs of the first two-split detector, summing means for summing the outputs of the first two-split detector, and dividing means for dividing an output of the difference by an output of the summing means.

22. A mastering machine according to claim 20, wherein the second light detecting means includes difference means for subtracting outputs of the second two-split detector, summing means for summing the outputs of the second two-split detector, and dividing means for dividing an output of the difference means by an output of the summing means.

23. A mastering machine for an optical disk comprising:
- light source means for providing a light beam;
- beam dividing means for dividing the light beam from the light source means into first and second beams;
- first and second light modulating means respectively disposed in optical paths of the first and second beams for modulating intensities of the first and second beams;
- beam combining means for combining first and second modulated beams from the first and second light modulating means;
- beam splitting means for splitting for a portion of each of the first and second modulated beams and for enabling a remaining portion of each of the first and second modulated beams to pass therethrough;
- recording lens means for focusing the passed through portions of the first and second modulated beams onto a master disk so that light spots of the first and second modulated beams on the master disk are spaced from each other in a radial direction of the master disk;
- first light detecting means including a first two-split detector for receiving the split off portion of the first modulated beam and for generating, in accordance with a difference output from the first two-split detector, a first position signal representative of a position at which an image of the split off portion of the first modulated beam projects onto the first two-split detector;
- second light detecting means including a second two-split detector for receiving the split off portion of the second modulated beam and for generating, in accordance with a difference output from the second two-split detector, a second position signal representative of a position at which an image of the split off portion of the second modulated beam projects onto the second two-split detector;
- first steering means for controlling a relative position of the image of the split off portion of the first modulated beam and the first light detecting means;
- second steering means for controlling a relative position of the image of the split off portion of the second modulated beam and the second light detecting means;
- means forming a first closed loop including the first steering means and the first light detecting means for controlling the first steering means in accordance with the first position signal so that the position of the image of the split off portion of the first modulated beam agrees with a predetermined position of the first two-split detector; and
- means forming a second closed loop including the second steering means and the second light detecting means for controlling the second steering means in accordance with the second position signal so that the position of the image of the split off portion of the second modulated beam agrees with a predetermined portion of the second two-split detector;

whereby the light spots of the first and second modulate beams are maintained at a predetermined spacing from each other.

24. A mastering machine according to claim 23, wherein the first steering means is a light deflector disposed in the optical path of the first beam.

25. A mastering machine according to claim 23, wherein the second steering means is a light deflector disposed in the optical path of the second beam.

26. A mastering machine according to claim 25, wherein the light deflector also serves as the second light modulating means.

27. A mastering machine according to claim 23, wherein the second steering means is a light deflector disposed in optical paths of the split off portions of the first and second modulated beams.

28. A mastering machine according to claim 23, wherein the second steering means includes lens means disposed in optical paths of the split off portions of the first and second modulated beams for focusing the split off portions of the first and second modulated beams respectively onto the first and second two-split detector.

29. A mastering machine according to claim 23, wherein the second steering means includes moving means for moving the first and second two-split detector.

30. A mastering machine according to claim 23, wherein the first light detecting means includes difference means for subtracting outputs of the first two-split detector, summing means for summing the outputs of the first two-splits detector, and dividing means for dividing an output of the difference means by an output of the difference means by an output of the summing means.

31. A mastering machine according to claim 23, wherein the second light detecting means includes difference means for subtracting outputs of the second two-split detector, summing means for summing the outputs of the second two-split detector and dividing means for dividing an output of the difference means by an output means of the summing means.

* * * * *